US011355094B2

(12) United States Patent
Meouchy (10) Patent No.: US 11,355,094 B2
(45) Date of Patent: Jun. 7, 2022

(54) WIRELESS VIRTUAL DISPLAY CONTROLLER

(71) Applicant: BadVR, Inc., Los Angeles, CA (US)

(72) Inventor: Jad Meouchy, Loa Angeles, CA (US)

(73) Assignee: BadVR, Inc., Los Angeles, CA (US)

( * ) Notice: Subject to any disclaimer, the term of this patent is extended or adjusted under 35 U.S.C. 154(b) by 210 days.

(21) Appl. No.: 16/139,002

(22) Filed: Sep. 22, 2018

(65) Prior Publication Data

US 2020/0098343 A1 Mar. 26, 2020

(51) Int. Cl.
*G10H 1/00* (2006.01)
*G06F 3/04815* (2022.01)

(52) U.S. Cl.
CPC ......... *G10H 1/0066* (2013.01); *G10H 1/0083* (2013.01); *G06F 3/04815* (2013.01); *G10H 2220/126* (2013.01); *G10H 2220/161* (2013.01); *G10H 2220/295* (2013.01); *G10H 2220/355* (2013.01); *G10H 2240/211* (2013.01); *G10H 2240/311* (2013.01)

(58) Field of Classification Search
CPC ............... G10H 1/0066; G10H 1/0083; G10H 2220/126; G10H 2220/161; G10H 2220/295; G10H 2220/355; G10H 2240/211; G10H 2240/311; G06F 3/04815
USPC .......................................................... 84/645
See application file for complete search history.

(56) References Cited

U.S. PATENT DOCUMENTS

| | | | | |
|---|---|---|---|---|
| 6,541,690 B1* | 4/2003 | Segers, Jr. | ........... | G10H 1/0091 84/743 |
| 7,928,311 B2* | 4/2011 | Trivi | ........................ | H04S 7/30 84/645 |
| 7,964,782 B2* | 6/2011 | Liu | ...................... | G10H 1/0091 84/602 |
| 8,426,718 B2* | 4/2013 | Lengeling | ................ | G10H 1/20 84/634 |
| 8,642,875 B2* | 2/2014 | Kinter | .................... | G10H 1/386 84/637 |
| 9,159,307 B1* | 10/2015 | Ludovici | ................ | G10H 1/344 |
| 9,196,236 B1* | 11/2015 | Buese | .................. | G10H 1/0066 |
| 10,593,313 B1* | 3/2020 | Bacigalupo | .............. | G10H 1/06 |
| 11,093,209 B2* | 8/2021 | Boyapalle | ............. | G06T 19/006 |
| 2003/0167907 A1* | 9/2003 | Annen | ..................... | G10H 1/46 84/615 |

(Continued)

FOREIGN PATENT DOCUMENTS

WO WO-2019161313 A1 * 8/2019 ............... G06F 3/01
WO WO-2019221747 A1 * 11/2019 ............. G01S 13/74

*Primary Examiner* — Christina M Schreiber
(74) *Attorney, Agent, or Firm* — Antero, Tormey & Petrin; Pete Tormey (57) ABSTRACT

A human interface device including a processor coupled to a memory. A plurality of switch banks, also coupled to the processor and a rotary dial and a slider, both coupled to control circuitry, said control circuitry operable to provide positional information from the dial and the slider to the processor. The rotary dial and slider are disposed on the human interface device to form an association with the switch bank, a drive transducer coupled to said processor, said drive transducer including a plurality of LED sources spatially positioned on a positioning ring, a set of non-transitory processor instructions operable to direct the processor to provide MIDI commands through a BLE port.

13 Claims, 3 Drawing Sheets

(56) References Cited

U.S. PATENT DOCUMENTS

| | | | |
|---|---|---|---|
| 2004/0206226 A1* | 10/2004 | Negoescu | G10H 7/006 84/600 |
| 2004/0231501 A1* | 11/2004 | Sim | G10H 1/34 84/719 |
| 2004/0233073 A1* | 11/2004 | Sim | G10H 1/34 341/22 |
| 2005/0030283 A1* | 2/2005 | Sim | G06F 3/021 345/156 |
| 2005/0087061 A1* | 4/2005 | Sim | G10H 1/0066 84/719 |
| 2005/0127309 A1* | 6/2005 | Spencer | G10H 1/0091 250/557 |
| 2006/0180008 A1* | 8/2006 | Negoescu | G10H 1/0066 84/645 |
| 2008/0046098 A1* | 2/2008 | Corbin | G11B 27/005 700/1 |
| 2009/0049980 A1* | 2/2009 | Sharma | G10H 1/34 84/436 |
| 2009/0301289 A1* | 12/2009 | Gynes | G10H 1/0066 84/645 |
| 2010/0014390 A1* | 1/2010 | Flum | G11B 27/105 369/4 |
| 2010/0064883 A1* | 3/2010 | Gynes | G10H 1/32 84/645 |
| 2010/0216547 A1* | 8/2010 | Coppard | A63F 13/08 463/31 |
| 2011/0094369 A1* | 4/2011 | Liu | G10H 1/0091 84/645 |
| 2012/0180622 A1* | 7/2012 | Sharma | G10H 1/34 84/744 |
| 2013/0112860 A1* | 5/2013 | Mizuno | G01D 5/34707 359/439 |
| 2013/0305906 A1* | 11/2013 | Kinter | G10H 1/38 84/613 |
| 2014/0053712 A1* | 2/2014 | Dreher | G10H 1/0066 84/645 |
| 2014/0202316 A1* | 7/2014 | Szalay | G10H 1/0066 84/645 |
| 2016/0104471 A1* | 4/2016 | Hyna | G10H 1/386 84/613 |
| 2016/0189699 A1* | 6/2016 | Garet | H04H 60/04 345/184 |
| 2016/0358593 A1* | 12/2016 | Moulios | G10H 1/36 |
| 2017/0032775 A1* | 2/2017 | Schlessinger | G10H 1/0556 |
| 2018/0025711 A1* | 1/2018 | Bhamra | G10H 1/0066 84/600 |
| 2018/0190250 A1* | 7/2018 | Hiskey | G06F 3/0412 |
| 2018/0314344 A1* | 11/2018 | Chambers | F41G 3/30 |
| 2019/0079302 A1* | 3/2019 | Ninan | G06F 1/1656 |
| 2019/0113966 A1* | 4/2019 | Connellan | G01S 11/16 |
| 2020/0098343 A1* | 3/2020 | Meouchy | G06F 3/011 |
| 2020/0310533 A1* | 10/2020 | Nicholson | G06T 19/006 |
| 2020/0367970 A1* | 11/2020 | Qiu | G06T 15/005 |
| 2021/0256733 A1* | 8/2021 | Iyer | G02B 27/017 |

* cited by examiner

WIRELESS VIRTUAL DISPLAY CONTROLLER

BACKGROUND

Virtual reality (VR) and its technical cousin augmented reality (A/R) conventionally require a human interface device (HID) to effectuate the full features of the technology. For example, a user will often wear VR goggles to see into the virtual reality world. The motion of the user is fed back to the VR system to change the display and provide the sensation of reality. Human interface devices suffer from clumsy controls and motions detracting from the full effect of the VR display. Often users require input devices with conventional triggers and push-buttons in each hand to operate even simple VR systems. These conventional controllers are throw-backs to the early days of video gaming and are of limited capabilities. As game inputs they might be acceptable, however, when using VR displays to show complex data, simple controllers are not sufficient to help a user glean valuable insights.

Humans process visual information rapidly and excel at pattern recognition. However, patterns are generally buried in data, often appearing as noise. Having the ability to "play with" the data, by continuously varying it, might allow a human user to see patterns hidden in the noise. Therefore, a way to easily alter complex data is desirable for large scale data manipulation.

SUMMARY

Disclosed herein are systems and methods for a human interface device including a processor coupled to a memory or other data storage devices. A plurality of switch banks, also coupled to the processor and a rotary dial and a slider, both coupled to control circuitry, said control circuitry operable to provide positional information from the dial and the slider to the processor. The rotary dial and slider are disposed on the human interface device to form an association with the switch bank, a drive transducer coupled to said processor, said drive transducer including a plurality of LED sources spatially positioned on a positioning ring, a set of non-transitory processor instructions operable to direct the processor to provide MIDI commands through a BLE port. Alternative embodiments may include DMX protocols.

Embodiments include coupling through MIDI and similar protocols to a remote system operable to display data in 3D format. The human interface device may provide for selection of differing data sets to be displayed along with slidable or rotatable controls which effect the transmission of MIDI commands to a remote system and consequently, effectuate different data views.

The human interface device (or controller) may include tracking markers to facilitate position determination in certain embodiments.

The construction and method of operation of the invention, however, together with additional objectives and advantages thereof will be best understood from the following description of specific embodiments when read in connection with the accompanying drawings.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

The term "virtual machine" or "VM" generally refers to a self-contained operating environment that behaves as if it is a separate computer even though is is part of a separate computer or may be virtualized using resources form multiple computers.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Processing System

The methods and techniques described herein may be performed on a processor based device. The processor based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, slide controls, dials, pushbuttons, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover any device or system that operates to effectuate techniques according to the current disclosure may be considered a server for the purposes of this disclosure if the device or system operates to communicate all or a portion of the operations to another device.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality. Alternatively the entire processing system may be self-contained on a single device.

Client Server Processing

Conventionally, client server processing operates by dividing the processing between two devices such as a server and a smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine readable instructions are conventionally known including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein a display engine, a data engine, an execution engine, a user interface (UI) engine and the like may be employed. These engines may seek and gather information about events from remote data sources.

Controller

Figure 1:
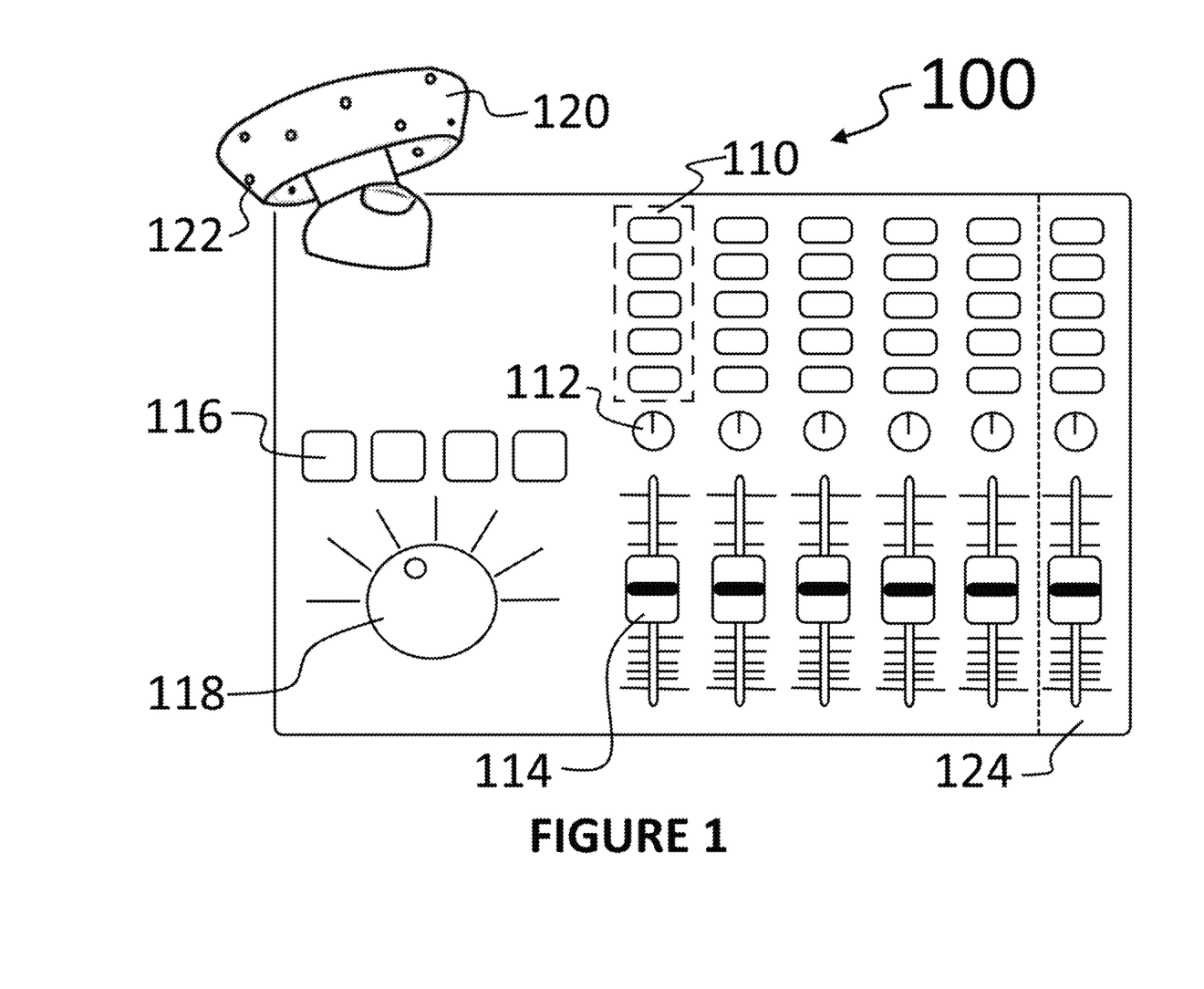
FIG. 1 shows a representative image of a wireless virtual display controller in accordance with the present disclosure.

FIG. 1 shows a representative image of a wireless virtual display controller 100 in accordance with the present disclosure. In FIG. 1 a series of pushbuttons 110, effectuating a switch bank, which is coupled to a processor (not shown). The buttons are arranged in an array and grouped according to the embodiment desired. Physically associated with the series of buttons 110 is a dial 112 and a slider 114. The dial 112 and slider 114 both control potentiometers which are in turn, coupled to and readable by, the processor. Each series of buttons 110, dial 112, and slider 114 are spatially represented to control a single, virtual channel when operating with the processor. Also on FIG. 1 is a master set of buttons 116 and a master dial 118 which operate, with the processor, to control features common to each channel.

As shown in FIG. 1, six channels may be controlled with the number of channels variable in differing embodiments. In some embodiments, the controller 100 may be modular allowing for additional channels to be affixed and connected electronically. Connecting additional buttons, dials, and slide potentiometers may be effectuated using conventional interconnects.

The controller 100 includes a motion controller for sensing motion of the user. An advantage of motion controllers over hand gesture sensing is that the motion controllers have a precise position in three-dimensional (3D) space, allowing for fine grained interaction with virtual digital objects and displays. The motion controller 100 may include one or more inertia measuring units (IMUs) (not shown) to sense velocity, orientation, and acceleration. Conventional IMUs are commercially available.

FIG. 1 also includes an optical-based positional tracking system. In certain embodiments the controller may include a barcode or other scannable indicia to provide for positional tracking. Conventional outside-in VR tracking uses cameras or other sensors placed in a stationary location and oriented towards the tracked object (e.g. a controller) that moves freely around a designated area defined by the intersecting visual ranges of the cameras. A positioning ring 120 is attached to the controller 100. Disposed in the positioning ring 120 are multiple LEDs 122 for use with visual or infrared tracking systems. Infrared or visual light LED tracking system may operate by sensing visual or infrared light movement in relation to the controller or other object. Positional tracking registers the exact position of the controller in space, recognizing forward/backward, up/down and left/right movement The controller 100 is wirelessly coupled to a virtual reality (VR) type system using conventional wireless communications technologies such as Bluetooth, Wi-Fi, cellular and the like. Moreover, the controller may have additional elements (not shown), including, but not limited to:

Additional channels;

Levers, touchpads, pressure-sensitive buttons, "force feedback" vibration motors for haptic feedback from the controller;

Components remotely controlled such as LED's, motorized faders, vibration feedback motors;

Rechargeable battery power;

Sensors to measure position, angle, movement (accelerometers), ambient light levels, wireless signal intensity, humidity, and the like; and Biometric sensors to restrict access to certain users, datasets or features;

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Operation

Figure 2:
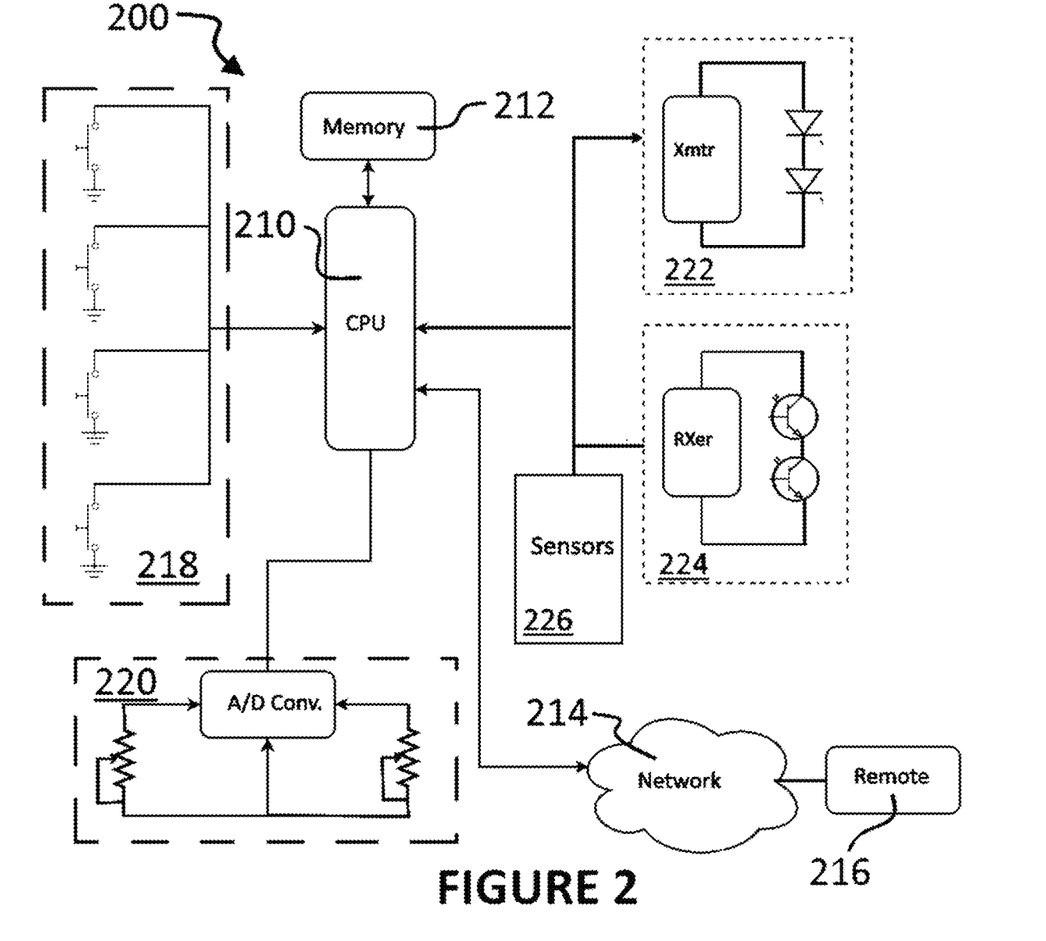
FIG. 2 illustrates a functional diagram of a controller according to the current disclosure.

FIG. 2 illustrates a functional diagram of a controller 200 according to the current disclosure. The controller 200 includes a processor 210. The processor is coupled to a memory 212 and, though a wireless communications port (not shown) to a wireless network 214 and to a remote system 216. The memory includes processor readable instructions directing the processor to perform the operations described herein. Electronically coupled to the processor 210 is a series of pushbuttons (or switches). Further coupled to the processor 210 is an analog to digital converter circuit 220 coupled to multiple potentiometers. The circuit 220 provides relative value information to the processor 10 in response to the position of the potentiometers. The potentiometers may be effectuated using conventional alternatives such as digital potentiometers, multi-position rotary switches, and the like. Conventional audio sliders provide for non-linear adjustments, however, certain embodiments may use potentiometers that are linearized or operated to provide certain non-linear gradients.

The processor 210 is further coupled to a drive transducer 222 for providing control of positioning information devices. As shown, the transducer 222 controls infrared LEDs which are spatially disperse on the controller 200. While LEDs are shown, other positing elements may also be employed. For example, and without limitation, magnets, speakers (acoustics), or a mixture of different elements.

Further coupled to the processor 210 is a receive transducer 224. As shown in FIG. 2, the receive transducer 224 has phototransistors which may operate to detect light, either directly or indirectly, from the drive transducer 222. The receive transducer may include sensors for non-optical information as well, including, but not limited to magnetics, microphones, and the like. Coupled to the processor 210 (not shown) are remote I/O circuits such as Bluetooth, NFC, Wi-Fi, and the like.

In certain embodiments, the receive transducer 224 may be coupled to the remote system 216 and not directly to the controller 200. In addition, the receive transducer 224 may be effectuated using one or more cameras. In these embodiments a fixed camera is used to determine the location of the controller 200.

Collectively the drive transducer 222 and the receive transducer 224 operate to provide position information for the processor 210 to transmit through the network 214 to the remote system 216. Conventional transducer control circuitry provides the necessary power, drive, reception and operational hardware to effectuate the positional information measurement.

Environmental sensors 226 are coupled to the processor and may operate in tandem with the drive transducers 222 and receive transducer 224 to determine controller 200 position. Such sensors may include, but are not limited to, accelerometers, humidity sensors, temperature sensors, GPS navigation sensors, and the like. Some embodiments may include a tracking device such as an RFID transponder or a tracking marker such as scannable QR code attached to the controller 200. Tracking markers work with a camera to identify the controller, and in some cases provide visual cues which trigger the display of virtual information on a remote system 216.

In some embodiments conventional "inside-out" tracking may be effectuated. Operating the drive transducer 222 and the receive transducer 224 in tandem may provide sufficient change in relative reflected light to determine a positional change in relation to the external environment. Inside-out tracking may be effectuated with or without markers around the environment.

Alternative embodiments may include conventional inertial measurement units (IMUs) which operate to provide accelerometer, gyroscope, or compass information.

The remote system 216 may be a server or a mobile computing device operable to interact with the controller

200. In certain embodiments the controller 200 acts as a terminal, with the bulk of the processing done by the remote system 216. Other embodiments may employ more processing functions on the controller 200.

Detailed Operations

In certain embodiments communications from the processor 210 to the remote system 216 are effectuated the MIDI protocol, which may be used over Bluetooth LE (BLE) or other suitable protocol. Conventionally, the aggregate protocol is commonly called BLE-MIDI and has compatibility with Windows 10, macOS, iOS, and Android. The MIDI protocol is well-documented and commonly consists of on-demand 3-byte messages sent over a serial bus between a host machine and the controller. Alternatively, a DMX protocol may also be implemented in certain embodiments.

In operation, decoding, performed in software, may extract and interpret the current state of the controller's buttons, dials, sliders, LED's, etc., and read or change them as needed. This translation may also be effectuated using a WebMIDI protocol. MIDI messages conventionally relay audio/visual and time-based information back and forth between devices. Accordingly, a remote system may translate MIDI messages into WebSockets for event-driven operation through a browser.

User Interface

The controller 200, in certain embodiments, operates to translate representations in VR (as a 3D model simulated in virtual space) wherein the controller 200 is in real physical space. The 3D model may be displayed on a remote device 216 as an application running on a mobile device. The display may be photographically accurate with lighting reflections and shadows, or may be a simplified rendering depending on the processing power of the application, or any variation thereof. Interactions with the controller 200 operate to control the display on the remote device. Each channel select button 218 may control the display of differing data sets through operation of the processor 210 and the remote system, 216. In some embodiments the remote system 216 may include a virtual reality headset as a display device.

In a representative embodiment, graphical user interface elements are anchored to a 3D model that represent the state of certain data analytics selected by one or more of the buttons 218. For example, a slider control 220 could be mapped to the opacity of a data layer on the remote device 216. As the slider is moved in one direction, the processor 210, using MIDI or other protocols, presents that information to the mobile application. In turn, the mobile application presents the data layer as more opaque. Alternatively, as a slide control 220 is moved in another direction, the data layer becomes more transparent. These graphical elements may animate for better usability, such as fading in text or moving arrows and lines. Moreover, each slider 220 may operate on separate data sets or channels to present an interactive user experience.

The mobile application may also represent the controller 200 on a remote system 216 display as a user is interacting with it. For example, and without limitation, in the slider example presented above, the actual opacity value, a percentage, could be displayed on an image of a slider knob itself as it is being slid, and then disappear shortly after the user has finished moving the slider. Thus, the graphical interface elements show the state of the data as well as the state of the controller's buttons and other components.

Using the positioning transducers 222 and 224, the controller 200 is aware of its relative position and detect when it is within a view on the mobile application and adjust its own presence or opacity or even extend virtual controls based on that state. When the user moves the controller away, the controller could hide its labels and become semi-transparent so as not to obstruct the view. When the user looks directly at the controller, the remote display could become more pronounced and a larger graphical user interface (GUI) could emit from it. The controller can also detect when it is idle or when it is resting on a table or being held in the hand and signal to the remote system 216 to change the display accordingly. For example, and without limitation to enter power-saving mode.

In contrast to conventional VR and AR systems, the remote system 216 may display datasets instead of, or along with, representative structures. The data layer presented on the remote system 216 may include a variety of data, including, but not limited to historical, geographic, demographic, economic, environmental, and others. Certain buttons 218 and knobs 220 may control traversal through these data sets including traversal though space or time. By way of example only, a button may move a virtual moving the user forward in the display or a knob may adjust the point time is being viewed.

A representative operations example may be a financial dataset. In a financial data view a time knob could rotate to move the data analytics through different times of day or increment/decrement minutes or seconds of a timecode clock. Knobs could control the threshold of data filtering, such as the minimum price of hotel rooms, or the maximum value of a rental property visualized in a 3D display of a city. Trends in rental values may be displayed over a time frame and a dial or slider may adjust that time frame. A second data set, for example, property prices, may be overlaid and the time frame display controlled by a separate slider. In this fashion, a user may visualize a relationship between rental prices and property values that is time dependent. Moreover, a button might cycle through different modes or scenes of data. This may have the effect of triggering other controls to re-map to different functions in response to the data displayed on a remote system 216.

In some embodiments multiple controllers 200 could be associated with a single data interface, functionally extending the hardware control interface across many devices instead of just one. These devices may also be visible to multiple users in the system, allowing any of them to interact with it even if that specific device is not paired to them. In some embodiments a controller 200 may be disabled for a specific user such that it becomes non-responsive when a different user interacts with it.

Some embodiments may have processors instructions directing the controller 200 to emulate MIDI commands thus allowing the controller 200 to be operated with conventional MIDI controlled applications on the remote system 216. In other embodiments custom MIDI like commands and messages may be transmitted and received by the controller 200, in effect using a MIDI protocol, but providing for custom control of the dial, slider and pushbutton operations.

Virtual Display

Figure 3:
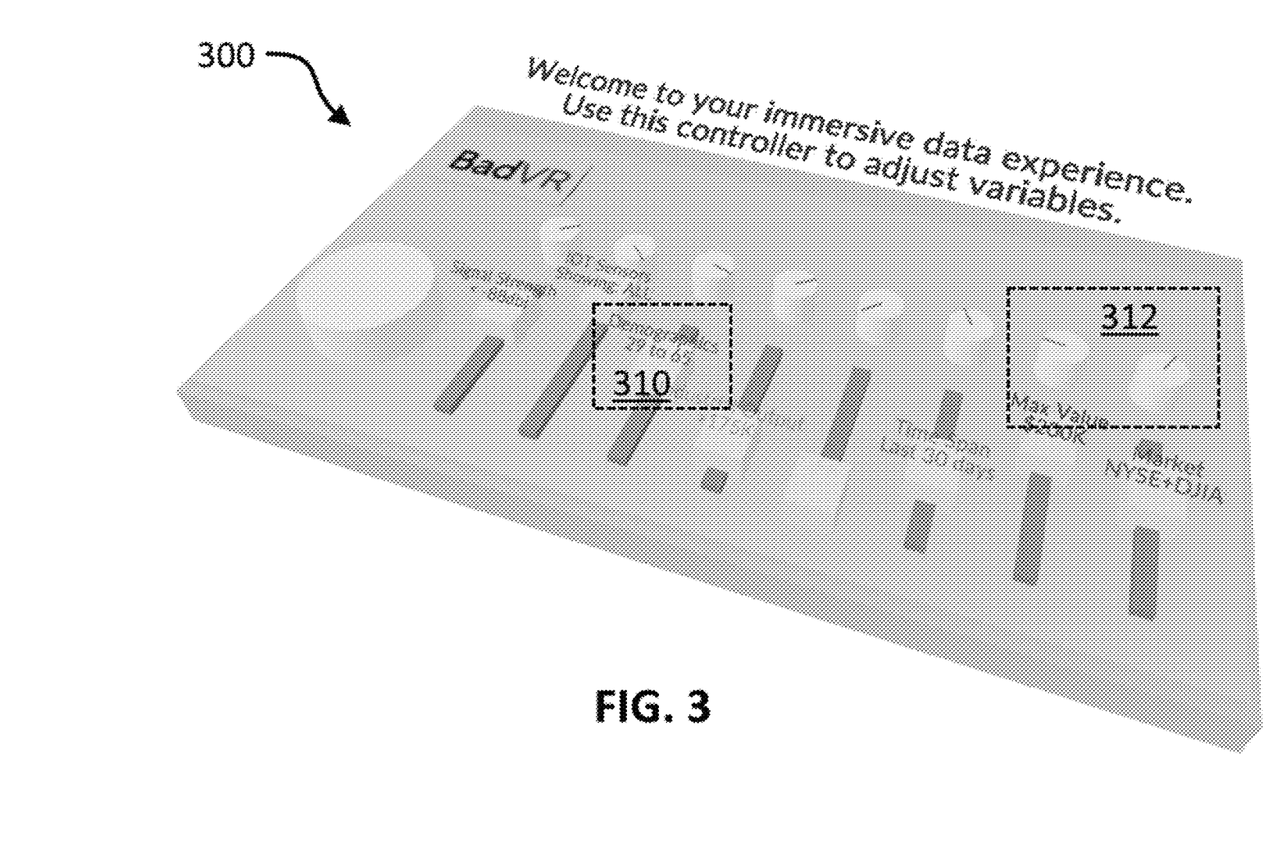
FIG. 3 shows a virtual representation of a controller.

FIG. 3 shows a virtual representation of a controller 300 which may be effectuated in some embodiments. These embodiments may include a virtual display presented on a graphics monitor, laptop, tablet or other display device. On the display may be a 2-D or 3-D a representation of the controller 200 showing an overlay of the switch controls 312 and slider values 310. As a user selects a switch from a switch bank, the virtual display would indicate the value of the switch on the display 312. Moreover, as a user adjusts a slider control, the value of the slider control may be shown on the display 310. This provides for additional graphic or textual feedback to a user controlling information on a mobile device or other display. Accordingly, a simplified controller may be operated with a presentation-rich display to provide more accurate control or a quick way to visualize many different data sets using a controller coupled to a remote device.

By coupling a controller to a virtual display a user can see the settings for each switch and which sliders operate on which data. The obviates the need for any labeling on the controller itself because a user can simply look at the display to see what data is presented and which buttons or slider to operate to change data.

Alternative Embodiments

Graphical user interface elements may be anchored to a 3D visualization that represent the state of the selected data analytics. For example, and without limitation, a slider could be mapped to the opacity of a data layer. As the slider is moved up, the data layer becomes more opaque; conversely, as it is moved down, the layer becomes more transparent. These graphical elements may animate for better usability, such as fading in text or moving arrows and lines. In the slider layer example, the actual opacity value, a percentage, could be drawn on the slider knob itself as it is being slid, and then disappear 2 seconds after the user has finished moving the slider. Thus, the graphical interface elements show the state of the data as well as the state of the controller's buttons and other components.

The controller may also measure when it is within view and can adjust its own virtual presence or opacity or even extend virtual controls based on that state. When the user looks away, the controller could hide its labels become semi-transparent so as not to obstruct the view. When the user looks directly at the controller, it could become more pronounced and a larger GUI could emit from it. The controller can also detect when it is idle or when it is resting on a table or being held in the hand.

Certain buttons and knobs may control traversal through space or time data, such as a button moving the user forward or a knob adjusting what point in time is being looked at. In a non-limiting finance example, this time knob could rotate to move the data analytics through different times of day or increment/decrement minutes or seconds of a timecode clock. Knobs may control the threshold of data filtering, such as the minimum price of hotel rooms, or the maximum value of a rental property visualized in a 3D city. A button may also cycle through different modes or scenes of data, potentially triggering other controls to re-map to different functions.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A human interface method including:
receiving at a processor switch position information, said switch selected from a set of switches;
receiving at the processor slider position information, said slider physically associated with the switch;
displaying, on a human interface device, a tracking marker operable to identify a position information of the human interface device by a remote optical-based positional tracking system;
converting the switch position, and slider position into MIDI compliant data, and
transmitting the MIDI compliant data to a remote system.

2. The method of claim 1 wherein the tracking marker is a plurality of LED sources spatially positioned on a positioning ring disposed on the human interface device.

3. The method of claim 2 wherein the plurality of LEDs is disposed substantially in a ring.

4. The method of claim 1 wherein the tracking marker is a QR code.

5. The method of claim 1 further including:
receiving, at the processor, sense information indicative of relative light intensity in the visible range associated with a position of the human interface device, said relative light intensity indictive of reflected ambient light of the tracking marker.

6. The method of claim 1 further including:
receiving at the remote system the MIDI compliant data, and
displaying, on a display coupled to the remote system, a 3-D representation of the switch position information or the slider position in response to the MIDI compliant data.

7. The method of claim 6 wherein the 3-D representation includes percentage of a switch position information or a slider position information.

8. A human interface method including:
receiving, at a processor, switch position information, said switch selected from a set of switches, said set of switches disposed on a human interface device, said switch position information in a MIDI compliant format;
receiving, at the processor, slider position information, said slider physically associated with the switch, and in a MIDI compliant format;
receiving at the processor position information from the human interface device, said position information operable to identify a location of the human interface device by a remote positional tracking system.

9. The method of claim 8 wherein an inertial measurement unit provides the positional information to the processor and the positional information is transmitted as MIDI compliant data to the remote system.

10. The method of claim 8 wherein the position information is a plurality of LED sources spatially positioned on a positioning ring.

11. The method of claim 8 wherein the position information is a QR code attached to the human interface device.

12. A human interface method including:
receiving, at a processor, switch position information, said switch selected from a set of switches, said switch disposed on a human interface device;
receiving, at the processor, slider position information, said slider physically associated with the switch;
receiving, at the processor, physical position information of the human interface device, said physical position information generated by an inertial measurement unit physically coupled to the human interface device;

transmitting the switch position information, slider position information, and physical position information to a remote system.

13. The method of claim 12 wherein the switch position information and the slider position information are converted in a MIDI compliant data format.

* * * * *